US008168901B2

(12) United States Patent  
Haj-Maharsi (10) Patent No.: US 8,168,901 B2
(45) Date of Patent: May 1, 2012

(54) CUTOUTS WITH AUTOMATIC RECLOSING (75) Inventor: Mohamed Y. Haj-Maharsi, Houston, TX (US)

(73) Assignee: ABB Research Ltd., Zurich (CH)

( * ) Notice: Subject to any disclaimer, the term of this patent is extended or adjusted under 35 U.S.C. 154(b) by 231 days.

(21) Appl. No.: 12/668,888

(22) PCT Filed: Jul. 10, 2008

(86) PCT No.: PCT/US2008/008479
§ 371 (c)(1),
(2), (4) Date: Apr. 23, 2010

(87) PCT Pub. No.: WO2009/014603
PCT Pub. Date: Jan. 29, 2009

(65) Prior Publication Data
US 2010/0230263 A1    Sep. 16, 2010

Related U.S. Application Data (60) Provisional application No. 60/952,088, filed on Jul. 26, 2007.

(51) Int. Cl.
*H01H 31/02* (2006.01)
(52) U.S. Cl. .......................... 200/48 R; 337/170
(58) Field of Classification Search ............. 200/48 R, 200/48 P, 48 A, 237, 318, 61.08, 48 SB; 337/171, 337/168, 401; 361/622, 626
See application file for complete search history.

(56) References Cited

U.S. PATENT DOCUMENTS

| 3,239,617 | A |   | 3/1966 | Rigert |   |
|---|---|---|---|---|---|
| 3,810,060 | A | * | 5/1974 | Hubbard | 337/155 |
| 4,045,762 | A | * | 8/1977 | Foulkes | 337/401 |
| 4,412,202 | A |   | 10/1983 | Russell |   |
| 6,687,110 | B2 |   | 2/2004 | Murray |   |
| 7,948,352 | B2 | * | 5/2011 | Tang et al. | 337/171 |

FOREIGN PATENT DOCUMENTS
WO     2007064489     6/2007

* cited by examiner

*Primary Examiner* — Edwin A. Leon
(74) *Attorney, Agent, or Firm* — Michael C. Prewitt (57) ABSTRACT A cutout is used in an electrical distribution network to electrically connect a first electric cable with a second electrical cable, The cutout includes an electrically non-conductive insulator having first and second end. A first terminal assembly is secured to the first insulator end. A second terminal assembly is secured to the second insulator end. A failsafe fuse assembly is pivotally secured to the second terminal and is movable between an engaged position and a lockout position. A reclosing mechanism is secured to the first terminal and monitors electrical current through the fuse assembly. If a fault condition exists, the reclosing mechanism opens and then closes the electrical link between the first and second electrical cable. If, after a predetermined number of closes, the fault condition still exists, the reclosing mechanism disconnects from the fuse assembly, allowing the fuse assembly to fall to the lockout position.

18 Claims, 13 Drawing Sheets

CUTOUTS WITH AUTOMATIC RECLOSING

CROSS REFERENCE TO RELATED APPLICATION

This application claims the priority of U.S. provisional patent application Ser. No. 60/952,088 filed on Jul. 26, 2007, entitled "Cutouts with Automatic Reclosing" the contents of which are relied upon and incorporated herein by reference in their entirety, and the benefit of priority under 35 U.S.C. 119(e) is hereby claimed.

FIELD OF THE INVENTION

This invention relates to electrical distribution equipment and more particularly to fault protection equipment for use in an electrical distribution network.

DESCRIPTION OF THE PRIOR ART

Due to the nature of electrical transmission and the unpredictability of outside influences (eg. lightning), protective devices are used to protect power distribution equipment from damage caused by excessive voltages and/or currents. One such protective device is known as a cutout, which functions to open a circuit when electric current in the circuit exceeds a predetermined level.

Typically, cutouts include a fuse element, releasably secured at one end to a first (upper) terminal and pivotally carried at the other end by a second (bottom) terminal. The fuse element includes an internal component that, upon exposure to a sufficiently high current, will melt or otherwise fail.

In order to prevent further arcing, the fuse element includes a latching element that is released downwardly upon melting of the fuse element. When the latching element drops, the fuse element detaches from the first (upper) terminal and is free to swing down under the influence of gravity. In this open orientation, further arcing is prevented and it is easy for electrical service personnel to identify fault locations.

Though such designs have proven effective in protecting power distribution equipment, deficiencies do exist. For example, often the event that caused the over-current is a singularity (ie. lightning) wherein the fault condition no longer exists immediately after the event. However, the fuse element, if properly functioning, is now blown and requires a utility service person to travel to the cutout, replace the fuse element, and reposition it to close the circuit. This takes a substantial period of time, and all the while, downstream customers remain without power. Further, putting numerous service persons out into the field, particularly during inclement weather, is both dangerous and expensive.

There is therefore a need in the art for more intelligent cutouts that are capable of clearing multiple faults prior to dropping to the open orientation.

SUMMARY OF THE INVENTION

In general, a cutout in accordance with the present invention is used in an electrical distribution network to electrically connect a first electric cable with a second electrical cable. The cutout includes an electrically non-conductive insulator having a first end and a second end. A first terminal assembly is secured to the first insulator end. A second terminal assembly is secured to the second insulator end. A fuse assembly is pivotally secured to the second terminal. A reclosing mechanism is secured to the first terminal and includes an engaging arm that is movable between a contact position and a release position. The engaging arm, when in the contact position, secures the fuse assembly in an engaged position proximate to the first terminal, thereby conducting electricity between the first and second electrical cables. The reclosing mechanism is adapted to temporarily interrupt power transmission between the first cable and the second cable upon detection of a fault condition.

In accordance with another aspect of the present invention, a cutout is adapted for use in an electrical distribution network to electrically connect a first electric cable with a second electrical cable. The cutout includes an electrically non-conductive insulator having a first end and a second end. A first terminal assembly is secured to the first insulator end and electrically connected to the first electric cable, the first terminal has a first and second electrically conductive spaced tooth. A second terminal assembly is secured to the second insulator end and is electrically connected to the second electric cable. A recloser assembly is pivotally secured to the second terminal and movable between an upright engaged position and a hanging, lockout position. The recloser assembly includes a reclosing mechanism having an engaging arm that is movable between an extended position and a retracted position. When the recloser assembly is in the upright position and the engaging arm is in the extended position, the engaging arm contacts one of the first or the second teeth. The reclosing mechanism moves the engaging arm to the retracted position when the reclosing mechanism senses a fault condition, thereby disengaging the engaging arm from the tooth.

In accordance with yet another aspect of the present invention, a cutout is used in an electrical distribution network to electrically connect a first electric cable with a second electrical cable. The cutout includes an electrically non-conductive insulator having a first end and a second end. A first terminal assembly is secured to the first insulator end. A second terminal assembly is secured to the second insulator end. A failsafe fuse assembly is pivotally secured to the second terminal and is movable between an engaged position and a hanging, lockout position. A reclosing mechanism is secured to the first terminal and monitors electrical current through the fuse assembly. If a fault condition exists, the reclosing mechanism opens and then closes the electrical link between the first and second electrical cable. If after a predetermined number of closes the fault condition still exists, the reclosing mechanism disconnects from the fuse assembly, allowing the fuse assembly to fall to the lockout position.

DETAILED DESCRIPTION

Figure 1:
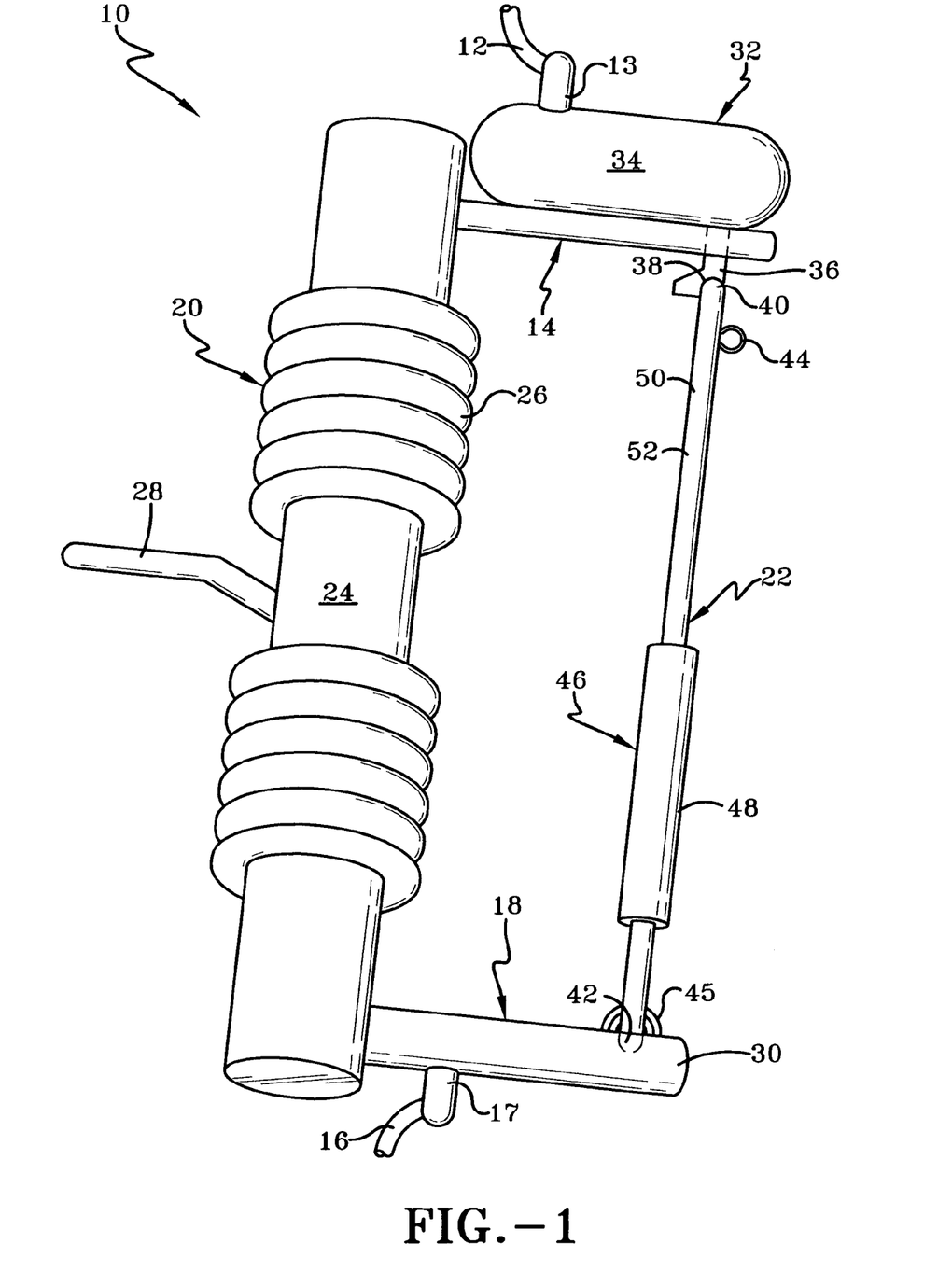
FIG. 1 shows a side view of a cutout according to the present invention in the closed orientation.

Referring now to FIG. 1, a first exemplary cutout, according to the present invention, is disclosed and generally indicated by the numeral 10. A first high voltage power line or electrical cable 12 is secured to the mounting bracket 13 of an upper line terminal assembly 14 (hereinafter upper terminal) and a second high voltage power line or electrical cable 16 is secured to the mounting bracket 17 of a lower line terminal assembly 18 (hereinafter lower terminal). Upper and lower terminals 14 and 18 are spaced by an insulator 20 and a fuse assembly 22.

Insulator 20 has an elongated central stem portion 24 defining a longitudinal direction, and a plurality of longitudinally spaced apart skirts 26 extending from stem portion 24. As is known in the art, insulator 20 is composed of non-electrically conductive materials and is attached to a pole or other support structure via bracket 28.

Figure 2:
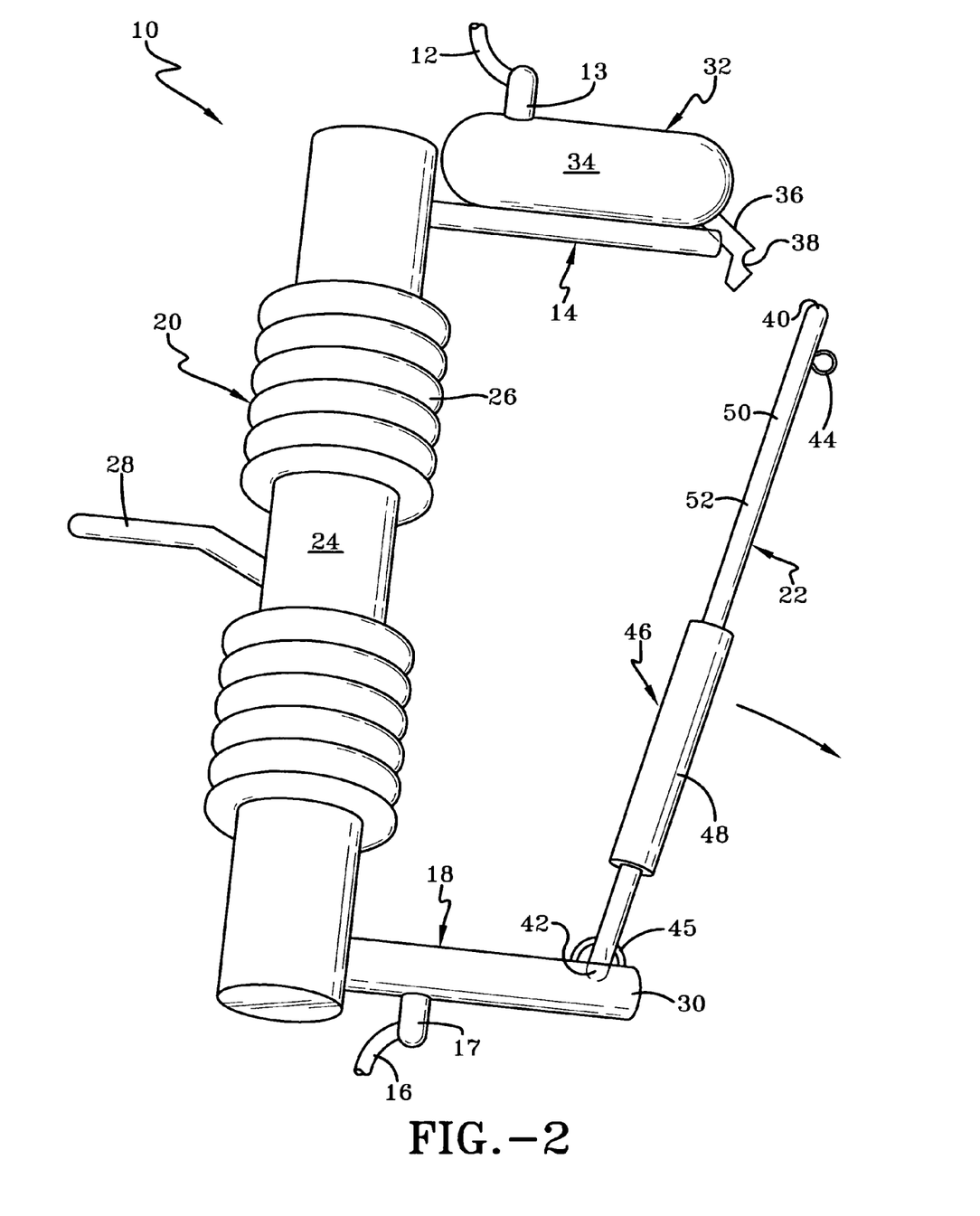
FIG. 2 shows a side view of the cutout of FIG. 1 after the reclosing mechanism releases the fuse element.

Insulator 20 essentially serves as a holder for fuse assembly 22, and under normal operating conditions maintains fuse assembly 22 in the upright or operative position (see FIG. 1). Cutout 10 is configured to allow fuse assembly 22 to swing downwardly away from upper terminal assembly 14 under certain conditions (see FIGS. 2 and 3). Bottom terminal assembly 18 therefore includes braces 30 that engage the bottom of fuse assembly 22 and allow pivotal movement thereon.

The top terminal assembly 14 carries a reclosing mechanism 32 that both secures fuse assembly 22 to upper terminal 14 and provides the electrical link between upper bracket 13 and fuse assembly 22. Reclosing mechanism 32 includes an outer housing 34 that protects and contains the operating electronics. A movable electrically conductive engaging arm 36 extends downwardly from housing 34. The engaging arm 36 is adapted to move between contact position (shown in FIG. 1) and a release position (shown in FIGS. 2 and 3). Engaging arm 36 may be composed of a resilient metallic material and include a C-shaped catch 38 that receives the upper contact end 40 of fuse assembly 22.

Thus, engaging arm 36, while positioned in the contact position, can receive and retain the upper contact end 40 of fuse assembly 22 within catch 38. Though the present embodiment shows a C-shaped catch, it should be appreciated that other engaging arm designs may be utilized to receive and thereafter hold upper contact end 40, for example, a one-way latch. It should further be appreciated that, though the present engaging arm 36 moves in a pivoting fashion, other movements are contemplated. For example, engaging arm 36 may move up and down along the longitudinal axis of fuse assembly 22.

While in the operative or closed position, fuse assembly 22 engages and electrically closes the circuit between upper electrical cable 12 and bottom electrical cable 16. Likewise, when fuse assembly 22 is in the inoperative position the electrical connection is open between upper and lower cables 12 and 16 (shown in FIG. 3).

Cutout 10 provides both primary and failsafe protection against over-currents that would otherwise damage downstream components. The primary protection is provided by recloser mechanism 32 that will be discussed later in more detail. The failsafe protection is provided by fuse assembly 22.

The fuse assembly 22 of the present invention includes a fuse element (not shown) that extends the approximate length of fuse assembly 22 and across a lower contact end 42. Fuse assembly 22 also has a circular ring member 44 located near the upper contact end 40 for inserting a hot stick used by a utility company lineman. The hot stick allows the lineman to manually open the electrical connection thereby allowing the lineman to safely replace the fuse assembly 22 or perform repairs on downstream equipment.

A coil spring 45 may be provided and connected to fuse assembly 22 and lower terminal 18. Coil spring 45 further biases fuse assembly 22 toward the open or locked out position. This ensures proper operation of cutout 10 even if cutout 10 is improperly mounted and fuse element 22 is vertically aligned or angled the wrong way.

Fuse assembly 22 may further include an indicator arrangement generally indicated by the numeral 46. Indicator arrangement 46 includes a cylindrical collar 48 that is received over the cylindrical body 50 of fuse assembly 22 for sliding engagement thereon. Collar 48 is longitudinally shorter than cylindrical body 50 so that a first surface 52 of cylindrical body 50 is visible when fuse assembly 22 is in the upright position. In one embodiment, the color of collar 48 may be the same as the color of surface 52. In these or other embodiments, collar 48 may be composed of a polymer material. It should also be appreciated that, though the present embodiment discloses a cylindrical collar, other shapes may be employed depending upon the shape of fuse assembly 22 and overall size requirements.

Indicator arrangement 46 further includes a marked area 54 (see FIG. 3) in the form of a painted or otherwise coated portion of cylindrical body 50. Marked area 54 creates a different visual appearance than surface 52. In one embodiment, the paint or coating may be a phosphorescent material. In these or other embodiments the paint or coating material may be reflective. In still other embodiments, the paint or coating may include a red or a yellow color. The coatings and/or paints employed should be bright and easily visible, particularly at night. The size of marked area 54 is such that collar 48 substantially covers it when fuse assembly 22 is in the upright position. In other words, collar 48 rests proximate to lower contact end 42 during normal/upright operation and thus, marked area 54 is proximate to lower contact end 42.

As shown in FIG. 1, during normal operation, fuse assembly 22 is in the engaged/upright position so that upper contact end 40 is held by engaging arm 36. While in this orientation, electricity may be transmitted from top electrical cable 12, through reclosing mechanism 32, through fuse assembly 22 and thereafter to bottom electrical cable 16. Reclosing mechanism 32 constantly monitors the electrical current passing through wire 12. When that current rises above a predetermined threshold, reclosing mechanism 32 temporarily trips or breaks the electrical connection between the upper wire 12 and fuse assembly 22. After a predetermined period of time, the electrical connection is restored. If, when the electrical connection is restored, the current again exceeds the threshold limit, the reclosing mechanism 32 will again temporarily trip or break the electrical circuit between upper wire 12 and fuse assembly 22. This loop will continue until the fault is cleared, ie. the current load returns to a level below the threshold value, or until a preset number of breaks is reached. When the preset number of breaks is reached, the recloser mechanism determines that a lockout condition is met. At that time, a solenoid (not shown) in housing 34 causes engaging arm 36 to pivot forward to the open or release position (shown in FIGS. 2 and 3).

Figure 3:
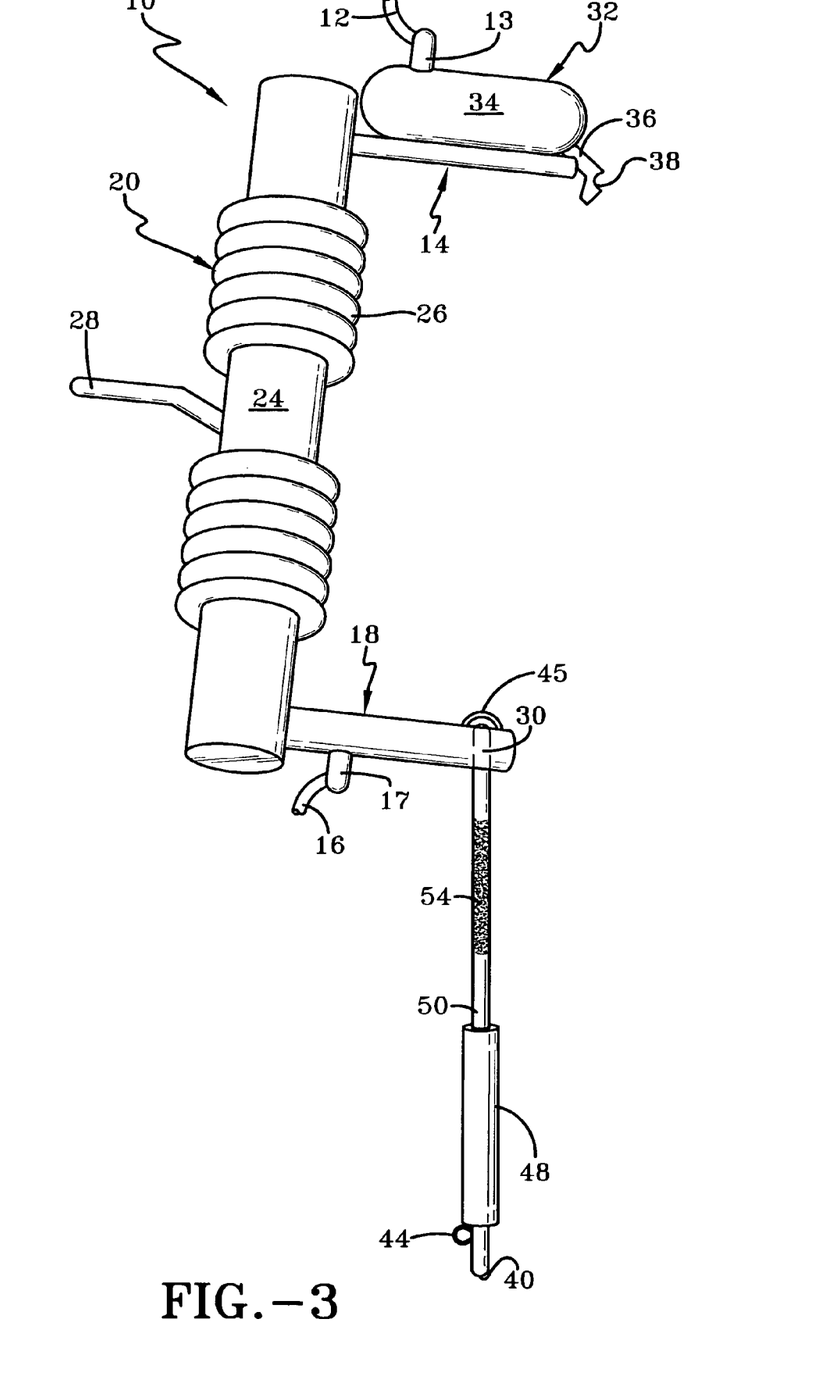
FIG. 3 shows a side view of the fuse element in the open orientation.

Thereafter, the circuit remains in the open or locked out state until a utility worker physically moves the fuse assembly 22 back to the upright/engaged position.

In this manner, multiple reclosing actions may be performed prior to final lockout of the cutout. This is particularly useful when the fault is a singularity such as a lightning strike or temporary contact with a tree branch. In such instances, the reclosing mechanism 32 will sense the fault, temporarily open the circuit and then reclose the circuit. This results in minimized transmission interruption while maintaining the same level of protection for downstream users.

Fuse assembly 22 operates similarly to prior art fuse assemblies, in that when sufficiently high current flows through the fuse assembly 22 the fuse element will blow. The fuse assembly, in turn, releases the engaging pressure on the engaging arm 36 by released tension on the fuse element. The released tension causes top contact end 40 to slightly drop vertically downward, and the fuse assembly 22 then swings outward and down to a locked out and electrically open position as shown in FIG. 3. The fuse assembly current rating is chosen so that, under normal fault conditions the recloser mechanism 32 is triggered before the fuse assembly 22 fails. In other words, the fuse assembly 22 current rating should be higher than the threshold limit for the recloser mechanism 32. Thus, the fuse assembly 22 is a failsafe element and will typically only blow in the case of failure of the recloser mechanism 32.

As fuse assembly 22 rotates to the downward/open position, collar 48 likewise will slide longitudinally along cylindrical body 50 toward upper contact end 40.

As shown in FIG. 3, collar 48 eventually engages or abuts against ring member 44 to prevent further sliding movement. At this time, marked area 54 is exposed so that the paint or coating is visible to a utility worker. In this manner, the failed fuse assembly is more visible to utility workers attempting to locate the fault. This enables more rapid repair service, particularly at night or during inclement weather.

Referring now to FIGS. 4-7, an alternative embodiment of the cutout is generally indicated by the numeral 100. As cutout 100 is similar in many respects to cutout 10, like numbers will indicate like elements.

Figure 4:
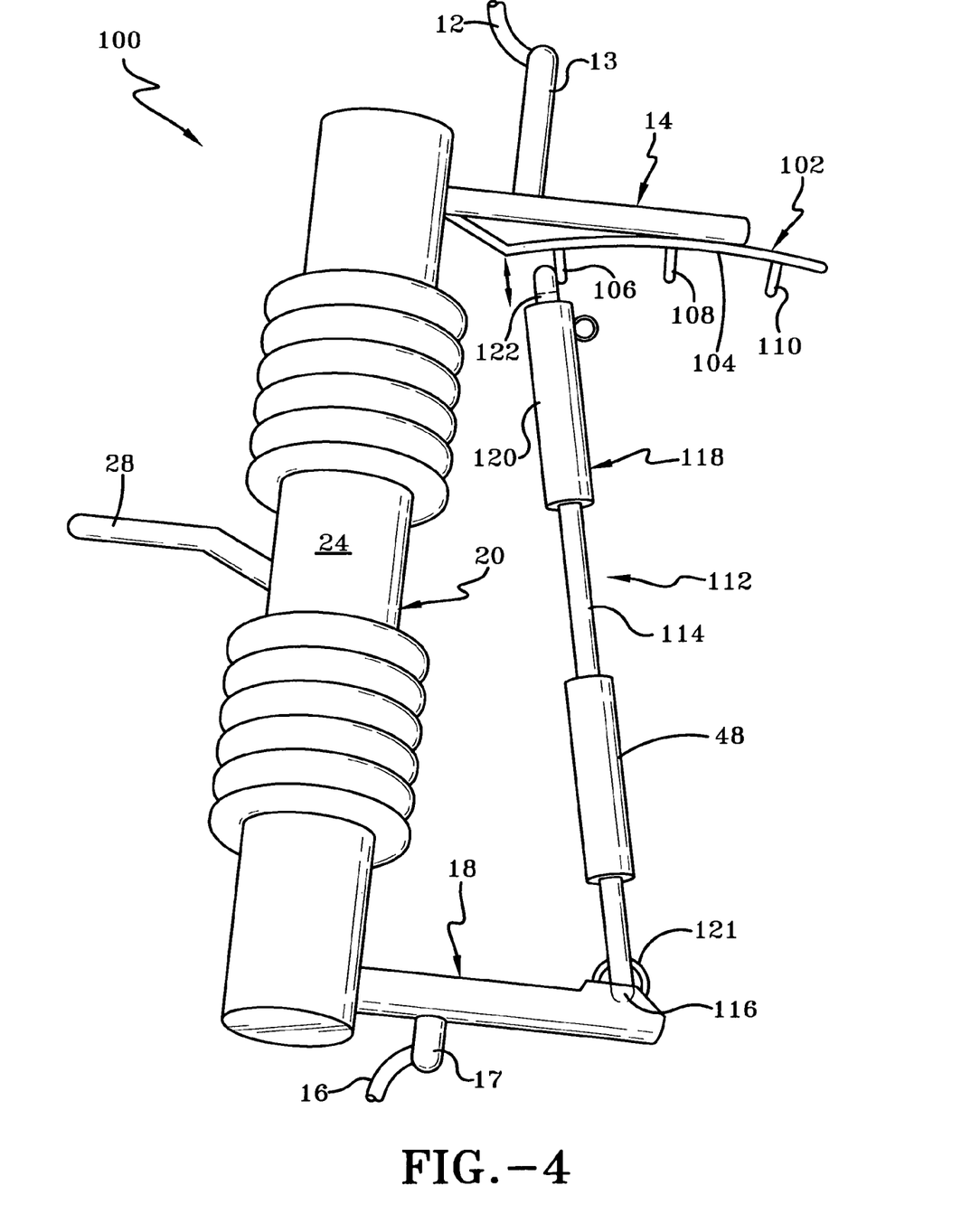
FIG. 4 shows a side view of a cutout according to an alternate embodiment of the present invention wherein the fuse element is resting against a first terminal finger.

Cutout 100 includes an insulator 20 that carries an upper terminal assembly 14 and a lower terminal assembly 18. Upper terminal assembly 14 includes a mounting bracket 13 that electrically connects to top electrical cable 12. Secured to the bottom of upper terminal assembly 14 is a link 102 having an arced base member 104. A first, second and third tooth 106, 108 and 110 are evenly spaced and extend downwardly from base 104. The base and teeth are all composed of electrically conductive material so that electricity is conducted between upper electric cable 12, upper terminal 14 and link 102.

Instead of a fuse element, as used in the previous embodiment, a reclosing assembly 112 is pivotally carried by bottom terminal 18. Reclosing assembly 112 includes a central shaft 114 having a bottom end 116 that is received by and pivotally carried in bottom terminal 18. A reclosing mechanism 118 is secured to the opposed end of shaft 114. Reclosing mechanism 118 includes a housing 120 that contains and protects the operating electronics. A movable electrically conductive engaging arm 122 extends upwardly from housing 120. The engaging arm 122 is adapted to move between a contacting position (shown in solid) and a release position (shown in dashed).

A coil spring 121 may be provided and connected to reclosing assembly 112 and lower terminal 18. Coil spring 121 further biases reclosing assembly 112 toward the open or locked out position. This ensures proper operation of cutout 100 even if cutout 100 is improperly mounted and reclosing assembly 112 is vertically aligned or angled the wrong way.

As shown in FIG. 4, during normal operation, recloser assembly 112 is in the engaged/upright position so that engaging arm 122 rests against first tooth 106. While in this orientation, electricity may be transmitted from top electrical cable 12, through upper terminal 14, then link 102, then first tooth 106, then through recloser assembly 112, to bottom terminal 18 and thereafter to bottom electrical cable 16. Reclosing mechanism 118 constantly monitors the electrical current passing through wire 12. When that current rises above a predetermined threshold, reclosing mechanism 118 causes a solenoid (not shown) in housing 120 to retract engaging arm 122. Engaging arm 122 retracts a sufficient distance to disengage from or release from first tooth 106. Because recloser assembly 112 is tilted slightly, the force of gravity will cause the recloser assembly 112 to pivot clockwise. After passing first tooth 106, engaging arm 122 again extends upwardly to the contact position. In one embodiment, a spring perpetually urges engaging arm toward the contact position and the solenoid opposes the spring, to move the engaging arm 122 to the release position.

Figure 5:
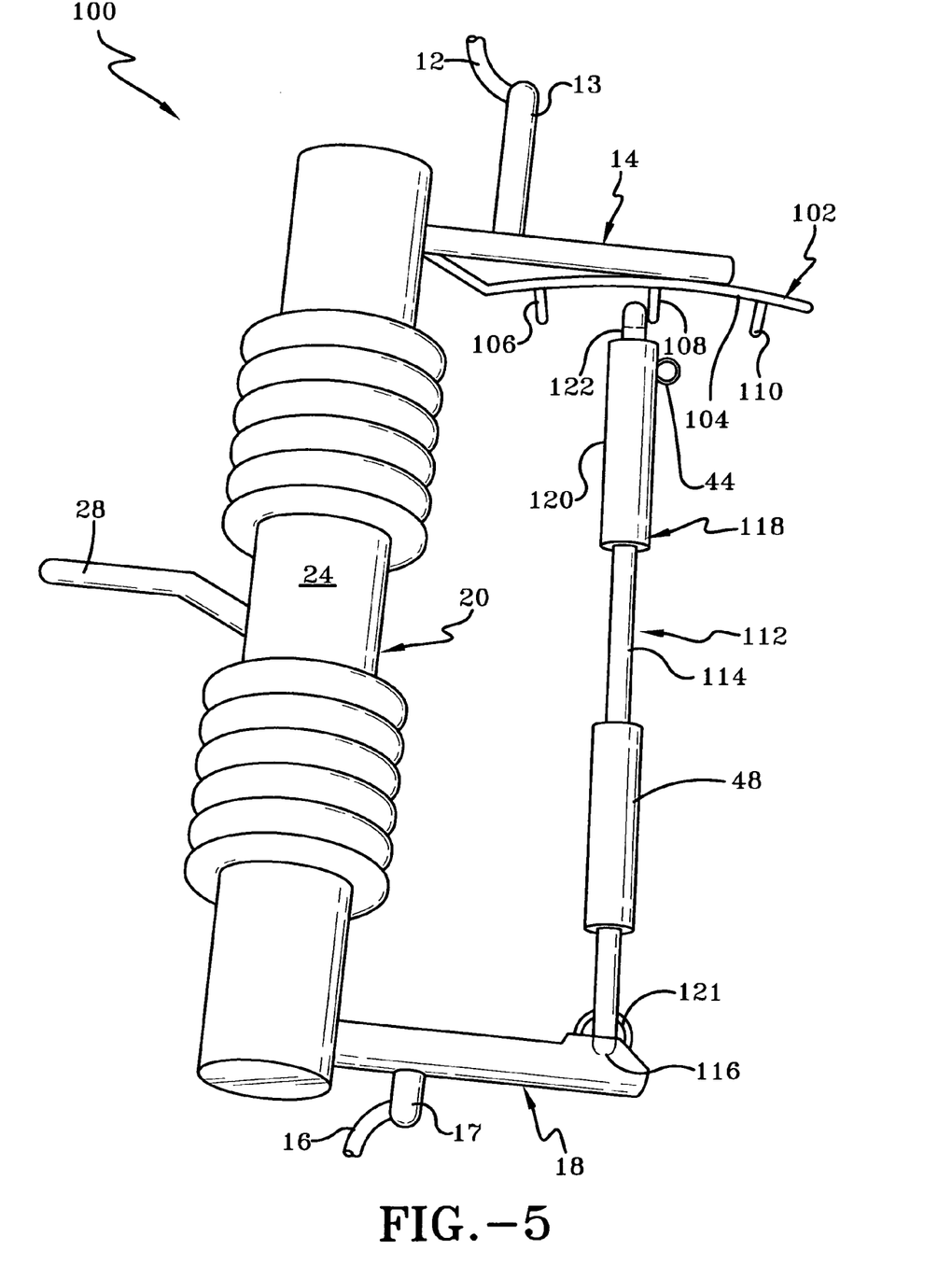
FIG. 5 shows a side view of the cutout of FIG. 4, wherein the fuse element is resting against a second terminal finger.
Figure 6:
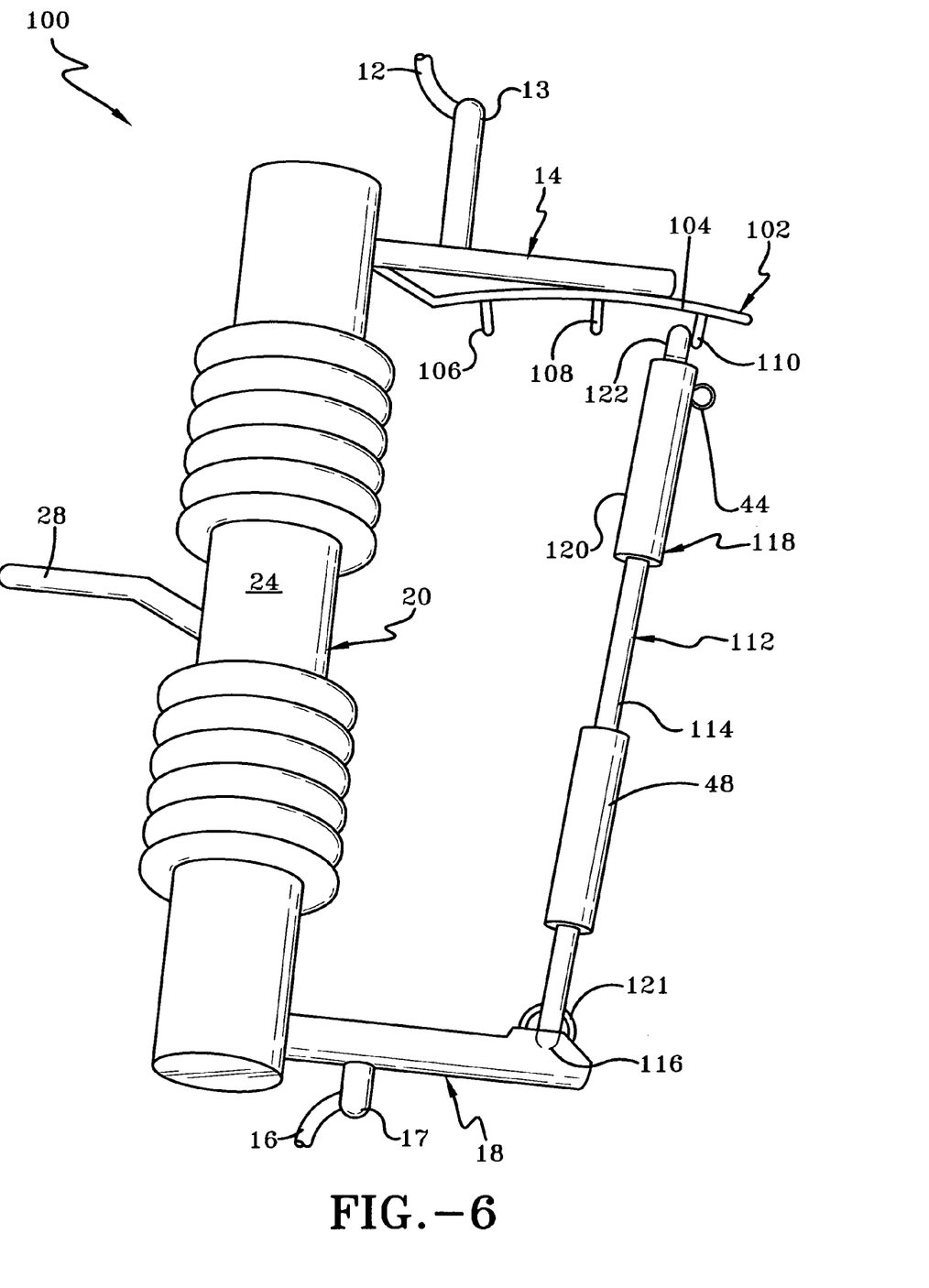
FIG. 6 shows a side view of the cutout of FIG. 5, wherein the fuse element is resting against a third terminal finger.
Figure 7:
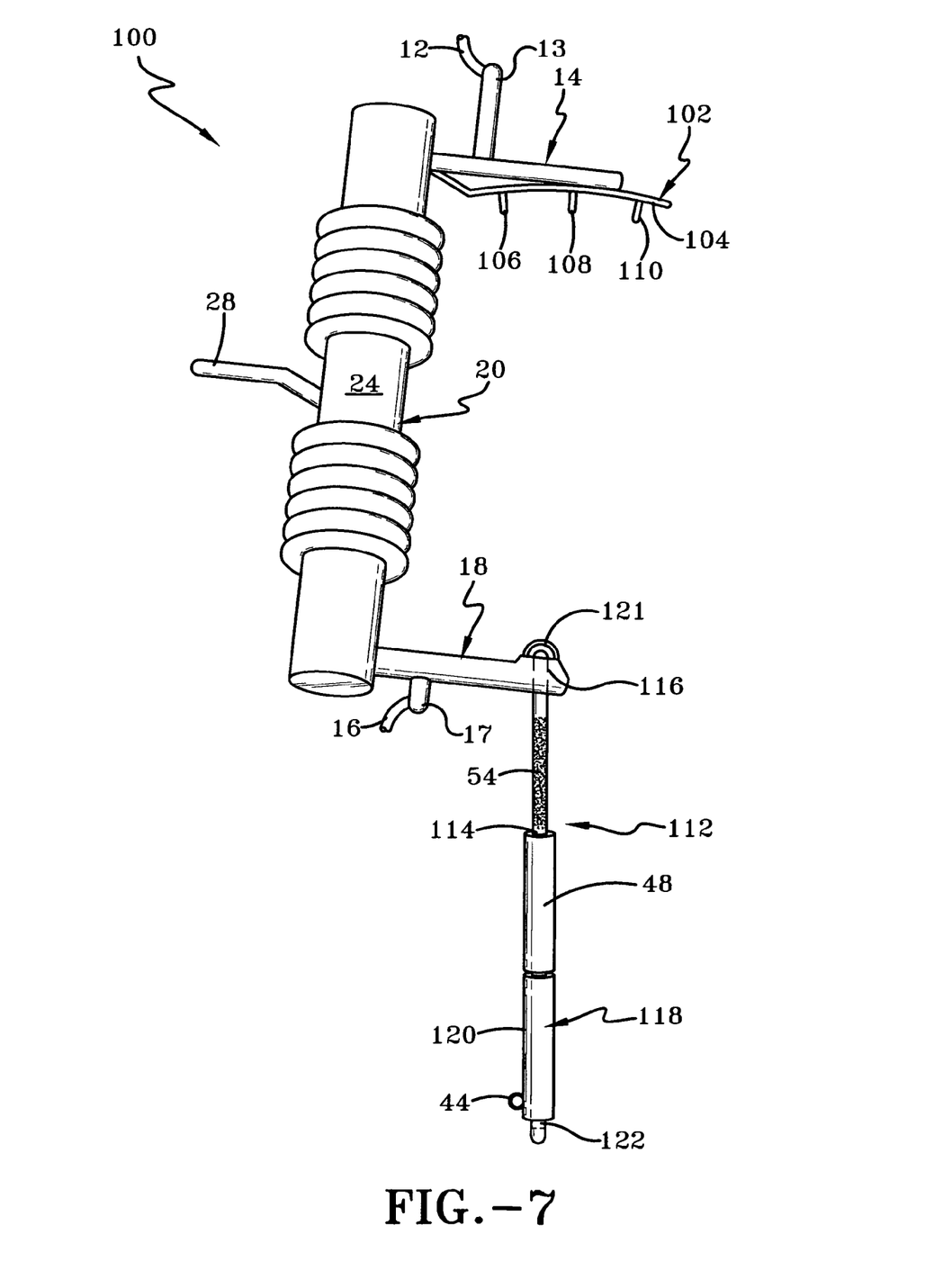
FIG. 7 shows a side view of the cutout of FIG. 4 in the open orientation.

Thus, recloser assembly 112 will pivot clockwise until engaging arm 122 contacts second tooth 108. During the time period between when engaging arm 122 disengages from first tooth 106 and engages second tooth 108, the fault condition may or may not have cleared. If the fault was a singularity such as lightning or a momentary contact with a tree limb, then upon contacting second tooth 108, the engaging arm 122 will remain extended and thereafter, electrical transmission will remain uninterrupted. However, if the fault condition remains, the reclosing mechanism 118 will retract engaging arm 122 each time it contacts a tooth. After contacting the third tooth 110, if the fault condition persists, the engaging arm 122 will retract a last time and the recloser assembly will pivot to the open position (shown in FIG. 7). Thereafter, the circuit remains open until a utility worker physically moves the recloser assembly 112 back to the upright/engaged position.

Thus, the number of reclosing operations is dependent upon the number of teeth provided and the reclosing time delay is determined by the distance therebetween. Though the present embodiment discloses three teeth, more or less may be used. As is evident, the present embodiment visually displays to utility service person the number of reclosing operations a recloser assembly has cycled through. Also, this simple design is robust and inexpensive, providing recloser like functionality within a traditional cutout design.

Figure 8:
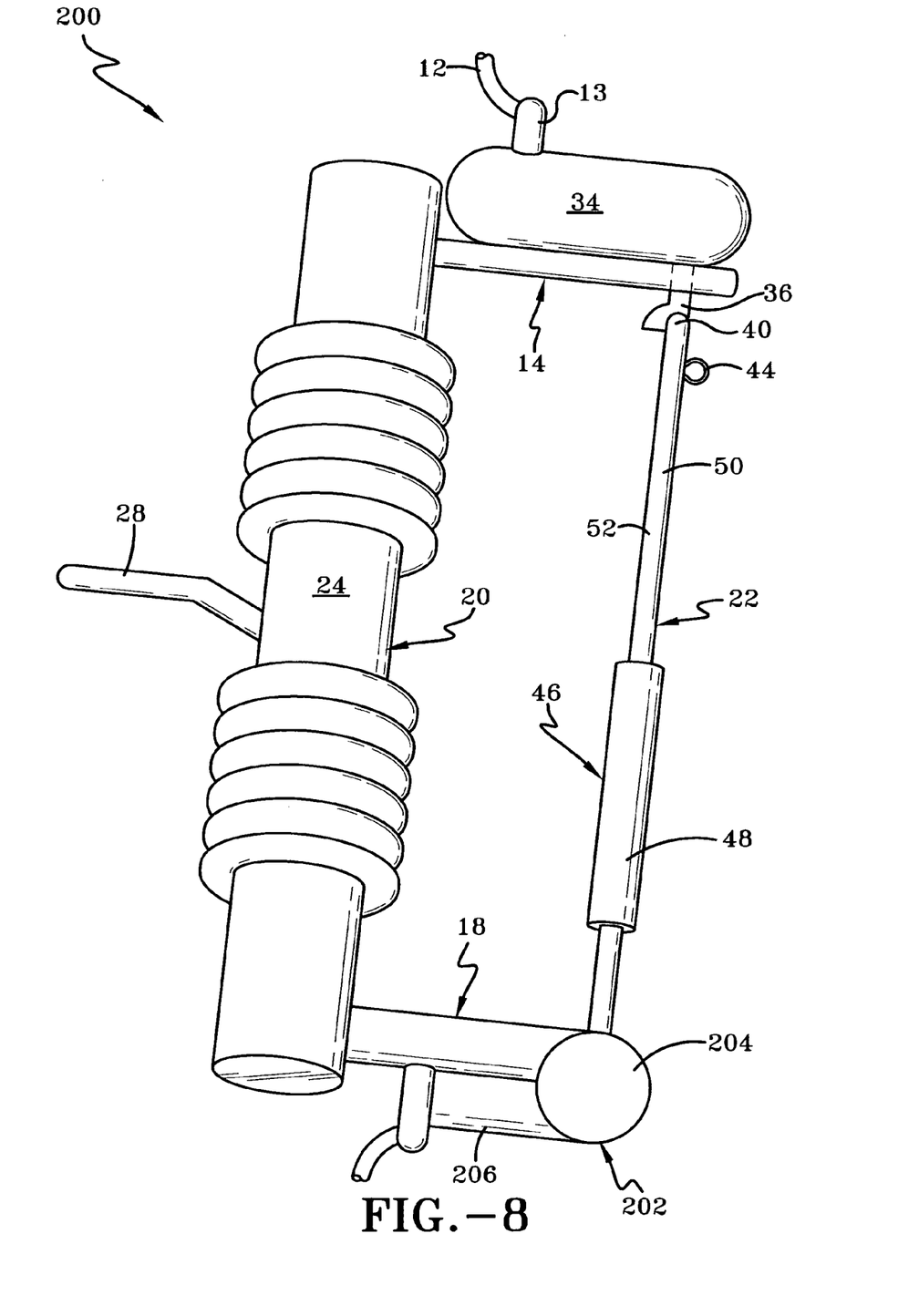
FIG. 8 shows a side view of a cutout according to a second alternate embodiment of the present invention, wherein the fuse element is resting against a first terminal finger.

Referring now to FIG. 8, a second alternative cutout embodiment is shown and generally indicated by the numeral 200. As is evident, the cutout of FIG. 8 is substantially similar to that shown in FIGS. 1-3 but also includes a motor module 202 secured to bottom terminal 18. Motor module 202 includes a DC motor 204 and a motor control unit 206. The DC motor 204 is operatively interconnected with the lower contact end 42 of fuse assembly 22 in a manner so as to allow normal pivoting motion when fuse assembly 22 disengages from engaging arm 36. A sensor within motor module 202 may sense the relative position of fuse assembly 22, ie. whether it is in the upright/engaged position or the hanging/open position.

The motor module 202 includes a two-way communication system that both communicates the status of the cutout and receives rearming commands. For example, the communication system may be a short range wireless transmitter, a SCADA or Ethernet. The communication system can receive a rearm command either from a remote location or from a local utility person using short range wireless transmitter. Upon receiving the rearm command, a motor in the motor module 102 causes the fuse assembly 22 to pivot counter-clockwise back to the engaged/upright position wherein the upper contact end 40 is again received in catch 38. In this manner cutout 200 enables automatic remote alarming and rearming.

Figure 9:
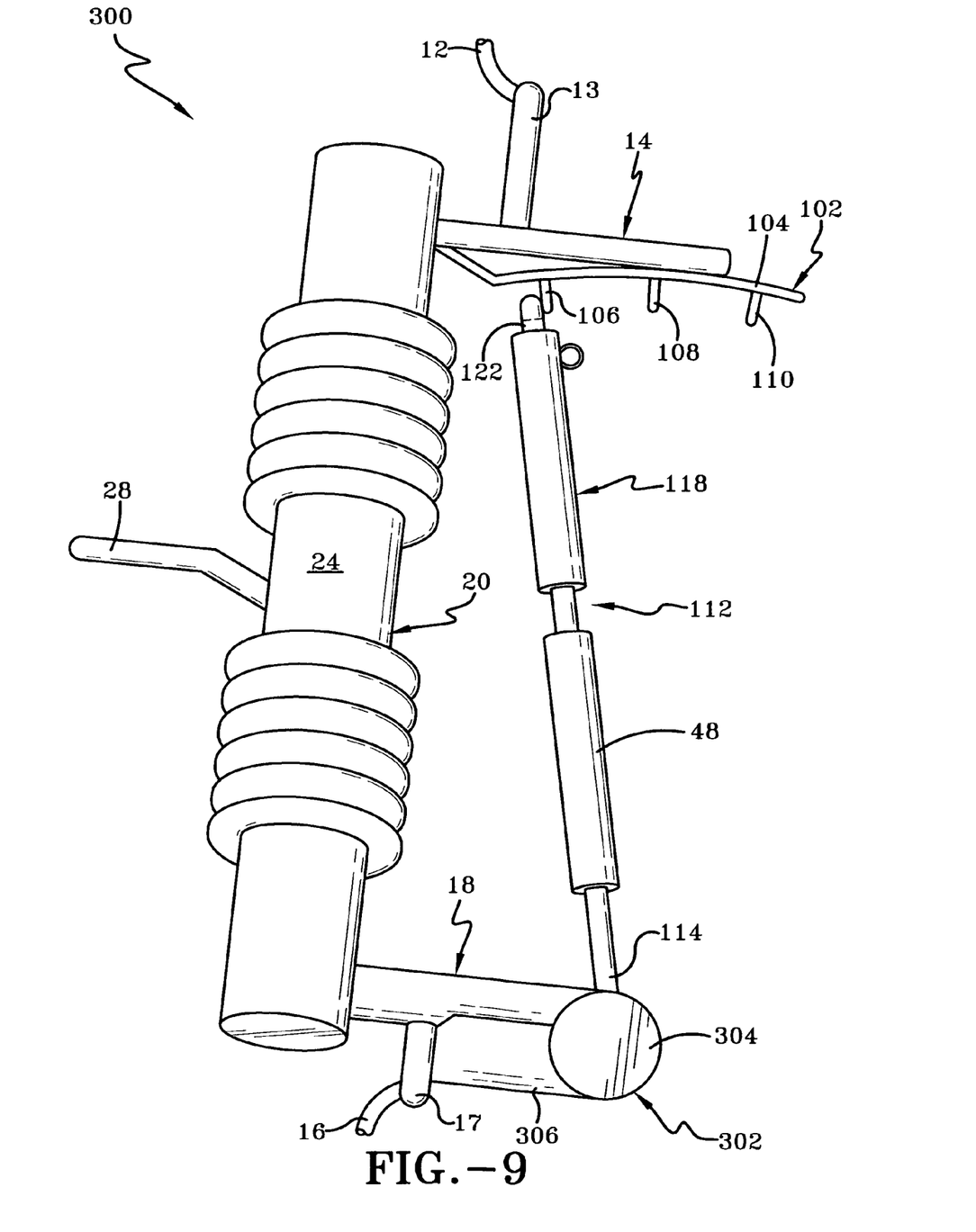
FIG. 9 shows a side view of a cutout according to a third embodiment of the present invention, wherein the cutout includes a motor module.

Referring now to FIG. 9, a third alternative cutout embodiment is shown and generally indicated by the numeral 300. As is evident, the cutout of FIG. 9 is substantially similar to that shown in FIGS. 4-7 but also includes a motor module 302 secured to bottom terminal 18. Motor module 302 includes a DC motor 304 and a motor control unit 306. The DC motor 304 is operatively interconnected with the lower end of recloser assembly 112 in a manner so as to allow normal pivoting motion when recloser assembly 112 disengages from link 102. Motor module 302 operates in a manner substantially similar to the motor module 202 discussed above. Motor module 302 may also communicate with reclosing mechanism 118 to ensure that engaging arm 122 is retracted during counterclockwise rotation to allow recloser assembly to reposition at the upright/engaged position. Thus, in this manner, motor module 302 allows automatic remote alarming and rearming.

Referring now to FIG. 10-13, an exemplary reclosing mechanism circuitry design is disclosed and includes a power module 400, a fault detection module 402, a switching module 404 and a lockout module 406. Modules 400-406 may be separate or may reside on a single circuit board.

Figure 10:
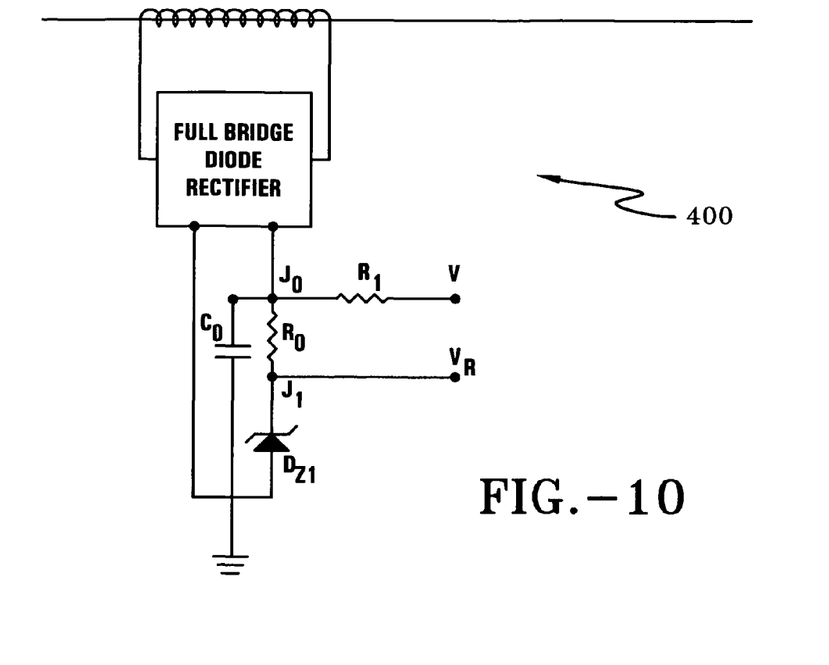
FIG. 10 shows a circuit diagram of the power module of the recloser of the present invention.

Referring now to FIG. 10, the power module 400 includes a current transformer to obtain power from the power line. The secondary of the transformer is electrically connected to the input of a full bridge diode rectifier which converts the source from AC power from the power line to DC. One output of the full bridge diode rectifier is electrically connected to a junction $J_0$. A resistor $R_1$ is connected between $J_0$ and the unregulated voltage V. A smoothing capacitor $C_0$ has one terminal connected to junction $J_0$ and the other terminal connected to ground. A resistor $R_0$ is connected between junction $J_0$ the junction $J_1$. The voltage at $J_1$ is a regulated voltage $V_r$. The cathode end of a zener diode $D_{z1}$ connects to $J_1$ and the anode end is connected to ground. In this manner, voltage V is an unregulated DC voltage that rises with the current in the power line. As will be seen, this voltage is used to sense faults. The voltage $V_r$ is a regulated DC voltage that is used to power the electronics and is used as reference for the comparator in the detection module.

Figure 11:
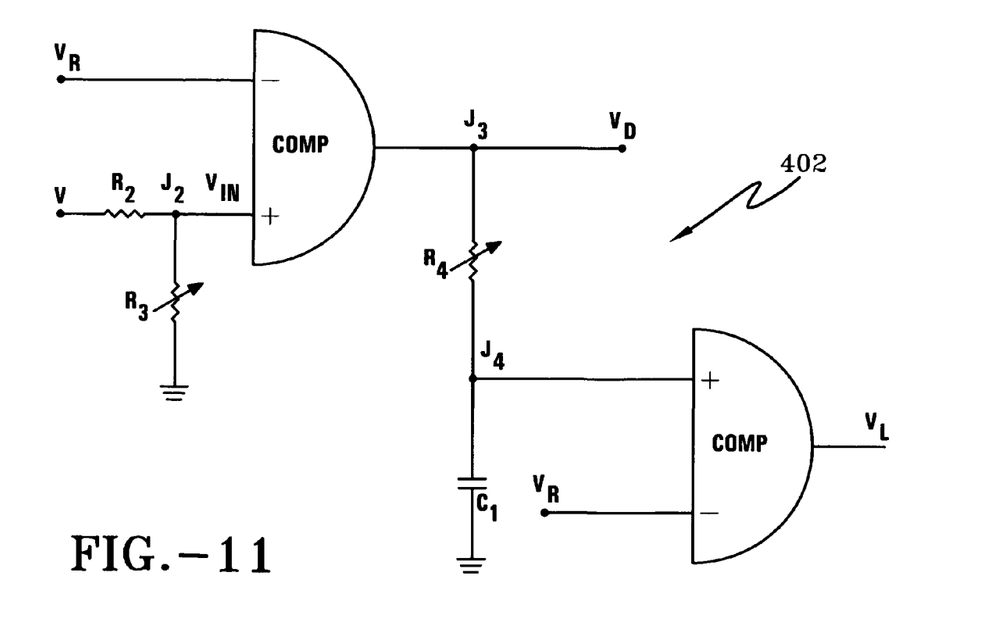
FIG. 11 shows a circuit diagram of the fault detection module of the recloser.

Referring now to FIG. 11, the fault detection module determines whether a fault condition exists. The regulated DC voltage $V_r$ is input into the negative side of a comparator. The unregulated DC voltage V is connected to one end of a resistor $R_2$, the other end of which is connected to a junction $J_2$. A variable resistor $R_3$ connects $J_2$ to ground. The resistors $R_2$ and $R_3$ form a voltage divider to convert the unregulated voltage V to the voltage $V_{in}$ at junction $J_2$. The voltage $V_{in}$ is input to the positive side of the first comparator. The output voltage of the first comparator is the fault detection voltage $V_d$, which is the input voltage to the switching module as will be hereinafter discussed. A variable resistor $R_4$ connects at one end to $J_3$ and at the other end to a junction $J_4$. A capacitor $C_1$ is connected at one terminal connected to junction $J_4$ and the other terminal is connected to ground. The positive input of a second comparator is also connected to junction $J_4$. The voltage $V_r$ is the voltage to the negative input of the second comparator, which outputs a lockout voltage $V_1$.

As described above, $R_2$ and $R_3$ act as voltage dividers and $R_3$ is variable to enable the user to select the threshold voltage where a fault is detected.

When $V_{in}$ is greater than $V_r$, the fault detection voltage $V_d$ at the output of the first comparator rises to indicate fault. The fault indication triggers the switching module and is received by the integrator that is formed by $R_4$ and $C_1$, and the capacitor $C_1$ is charged.

The charge in the integrator capacitor $C_1$ is representative of the number of times the high current is detected. When a preset value is reached for that voltage, the second comparator provides at its output a lockout voltage $V_1$. The preset value is adjusted by the variable resistor $R_4$.

Figure 12:
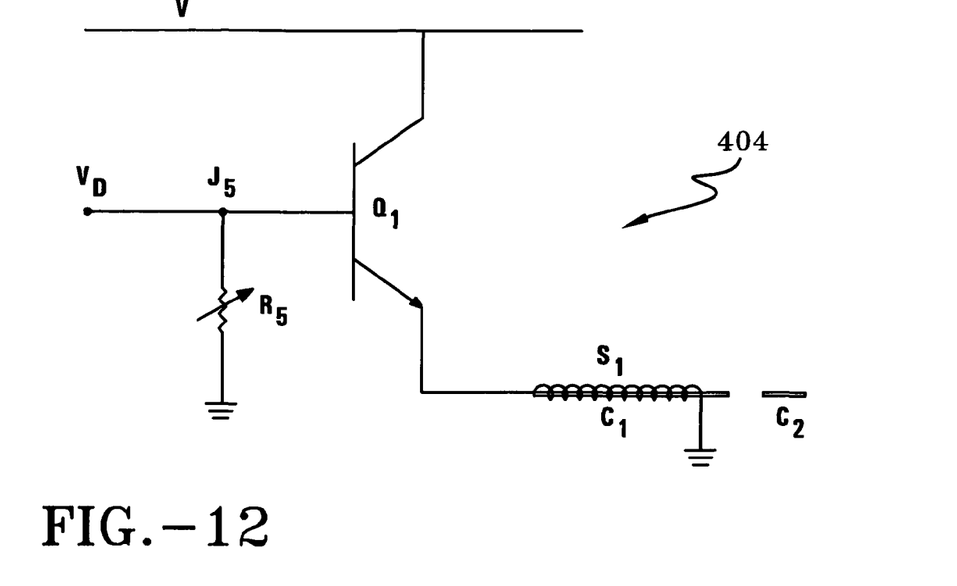
FIG. 12 shows a circuit diagram of the switching module of the recloser.

Referring now to FIG. 12, the switching module 404 receives the detection voltage $V_d$ and temporarily cuts power transmission through the reclosing mechanism. The detection voltage $V_d$ is connected to $J_5$ which is connect to ground through a resistor $R_5$. Junction $J_5$ is connected to the base input of a transistor $Q_1$. The collector of transistor $Q_1$ is connected to voltage V and the emitter connects to and selectively powers a solenoid $S_1$. The solenoid $S_1$ is connected to a first contact $C_1$, and when energized, moves contact $C_1$ away from a second stationary contact $C_2$. Contacts $C_1$ and $C_2$, selectively close and open the electrical connection between electrical wire 12 and fuse assembly 22.

Thus, when $Q_1$ receives the detection voltage $V_d$, it begins conducting, thereby powering solenoid $S_1$. The contact $C_1$ then moves away from fixed contact $C_2$ and the circuit is open and the current is interrupted.

Because the capacitor $C_0$ stores a charge, the solenoid $S_1$ will remain energized even after the circuit is open. The time duration solenoid $S_1$ energized is controlled by the resistor $R_1$ in the power module. In this manner, the electrical transmission is temporarily interrupted when a fault condition is sensed. Contacts $C_1$ and $C_2$ may be located in a vacuum or oil filled volume to inhibit the destructive effects of arcing.

Figure 13:
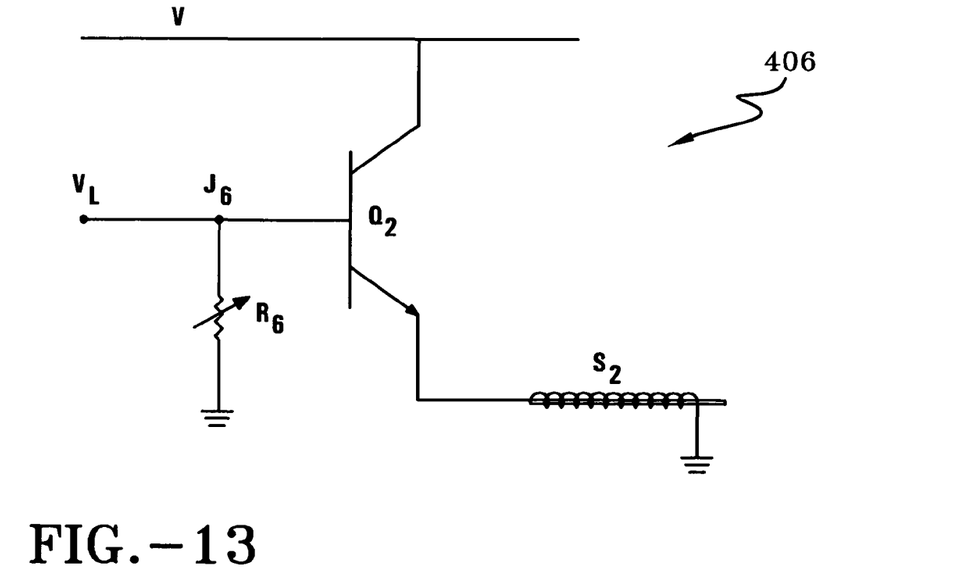
FIG. 13 shows a circuit diagram of the lockout module of the recloser.

Referring now to FIG. 13, the lockout module 406, upon receipt of a lockout voltage $V_1$ causes a second solenoid $S_2$ to move the engaging arm 36. The lockout voltage $V_1$ is connected to a junction $J_6$, which is connected to ground through a resistor $R_6$. $J_6$ is also connected to the base of transistor $Q_2$. Voltage V is input into the collector of transistor $Q_2$ and the voltage at the transistor emitter powers a solenoid $S_2$.

The engaging arm 36 is selectively moved by solenoid $S_2$.

Thus, upon receipt of a lockout signal $V_1$, the transistor $Q_2$ conducts power and powers solenoid $S_2$. The engaging arm 36 may be biased toward engagement with fuse assembly 22 and solenoid $S_2$ may oppose that bias and cause engaging arm to change position to allow the fuse assembly/recloser assembly to fall away to an open/lockout position.

Figure 14:
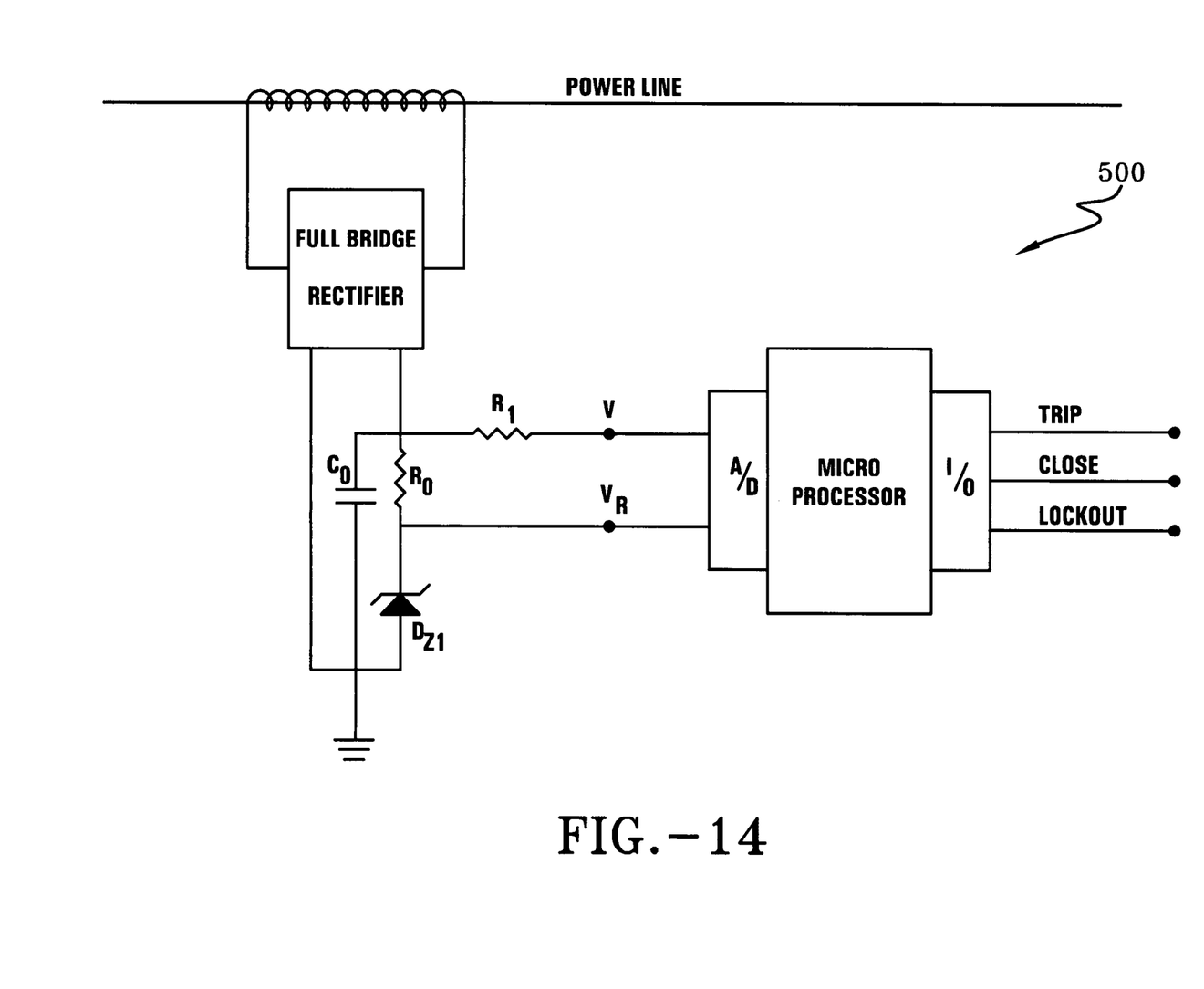
FIG. 14 shows a circuit diagram of an alternate, microprocessor based, recloser.

Referring now to FIG. 14, an alternative reclosing mechanism 500 is shown that utilizes a microprocessor.

As above, the reclosing mechanism 500 includes a current transformer to obtain power from the power line. The secondary of the transformer is electrically connected to the input of a full bridge diode rectifier which converts the source from AC power from the power line to DC. One output of the full bridge diode rectifier is electrically connected to a junction $J_0$.

A resistor $R_1$ is connected between $J_0$ and the unregulated voltage V. A smoothing capacitor $C_0$ has one terminal connected to junction $J_0$ and the other terminal connected to ground. A resistor $R_0$ is connected between junction $J_0$ the junction $J_1$. The voltage at $J_1$ is a regulated voltage $V_r$. The cathode end of a zener diode $D_{z1}$ connects to $J_1$ and the anode end is connected to ground. In this manner, voltage V is an unregulated DC voltage that rises with the current in the power line. The voltage $V_r$ is a regulated DC voltage that is used to power the electronics and is used as reference for the comparator in the detection module.

Voltage V and voltage $V_r$ are input to an analog to digital converter where they are converted to digital signals. The microprocessor monitors the signals to determine whether a fault condition exists and if so, whether to actuate a trip, close or lockout command. The I/O is a logic input output module that converts the microprocessor commands to analog commands that actuate the solenoids that temporarily open the circuit, in the case of a trip signal, close the circuit after a predetermined period of time, or cause the engaging arm 36 to move in the case of a lockout signal.

Figure 15:
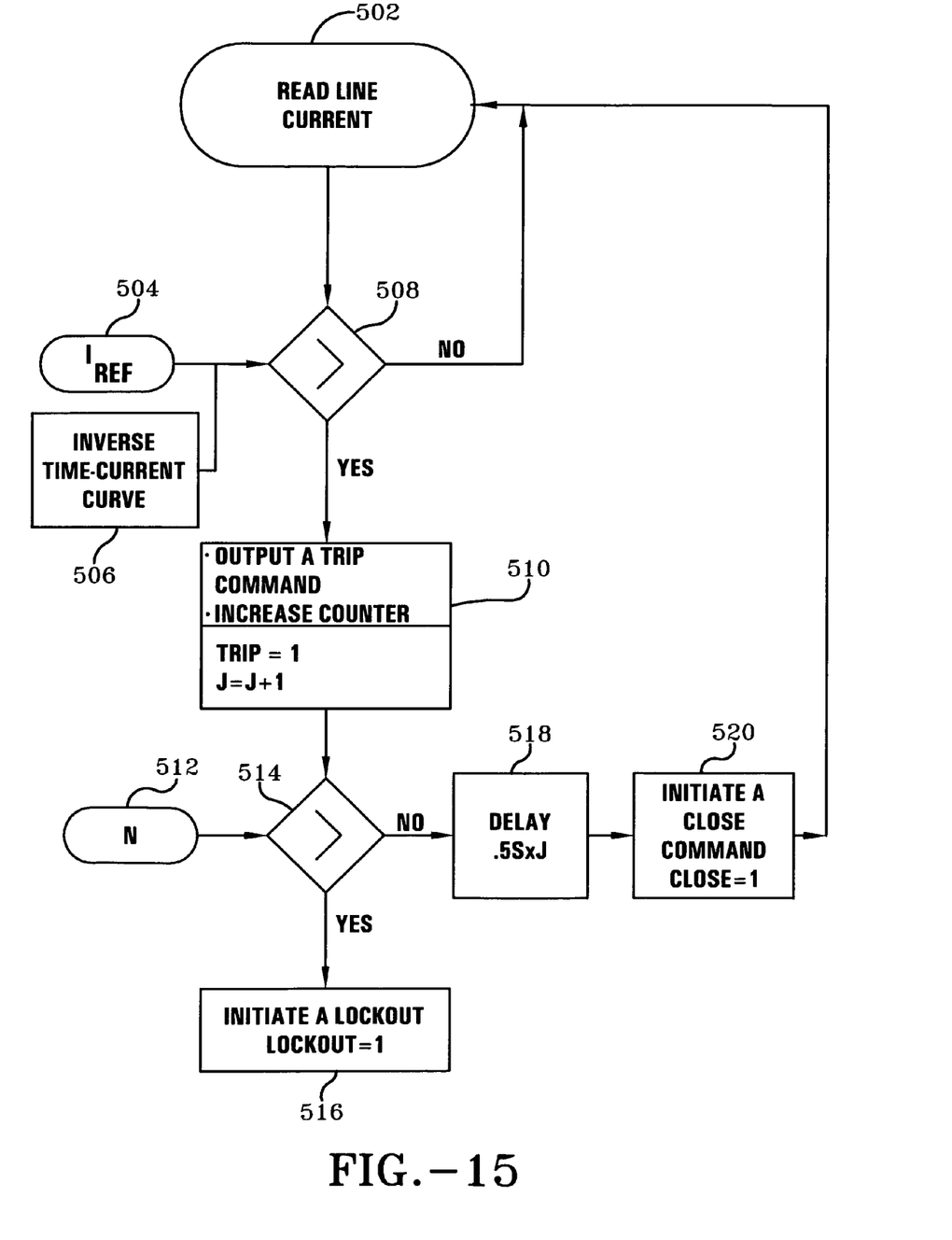
FIG. 15 shows a flow chart demonstrating the logic sequence in the microprocessor.

Referring now to FIG. 15, a flow chart shows the logic sequence of the microprocessor. The microprocessor reads line current at 502. At 504 a current threshold value Iref is stored. Based on the Iref value, an inverse time/current curve is determined at 506. At 508 it is determined whether the read current exceeds the threshold value. If not, the loop repeats. If so, a trip command is output at 510. The trip command, when sent through the I/O, causes the electrical circuit to temporarily open. Also at 510, the trip counter variable J is increased by 1. A recloser try number N is stored at 512, and at 514 it is determined whether the trip count J is greater than the recloser number N. If yes, a lockout command is initiated at 516 to cause the engaging arm to move to open the circuit. If no, a predetermined time delay occurs at 518. Thereafter a close command is initiated at 520 to reverse the trip command and close the circuit. The loop then begins again with another line current read.

It is to be understood that the description of the foregoing exemplary embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A cutout for use in an electrical distribution network to electrically connect a first electric cable with a second electrical cable, the cutout comprising:
   an electrically non-conductive insulator having a first end and a second end;
   a first terminal assembly secured to said first insulator;
   a second terminal assembly secured to said second insulator end;
   a fuse assembly pivotally secured to said second terminal;
   a reclosing mechanism secured to said first terminal and including an engaging arm that is movable between a contact position and a release position;
   wherein said engaging arm, when in said contact position, secures said fuse assembly in an engaged position proximate to said first terminal, thereby conducting electricity between the first and second electrical cable, said reclosing mechanism adapted to temporarily interrupt power transmission between the first cable and the second cable upon detection of a fault condition.

2. The cutout of claim 1 wherein said reclosing mechanism temporarily interrupts power transmission a predetermined number of times, and if after said predetermined number of interruptions, the fault condition remains, said engaging arm moves to said release position.

3. The cutout of claim 2 wherein when said engaging arm moves to said release position, said fuse assembly drops to a hanging, locked out position, thereby breaking the electrical connection between the first and second electrical cable.

4. The cutout of claim 1 said wherein the electrical load that triggers said fault condition in said recloser mechanism is lower than the electrical load at which said fuse assembly will blow.

5. The cutout of claim 1 wherein said engaging arm is adapted to pivot between said contact position and said release position.

6. The cutout of claim 1 wherein said engaging arm is adapted to move axially between said contact position and said release position.

7. The cutout of claim 1 wherein said reclosing mechanism includes a solenoid, said solenoid is mechanically interconnected to said engaging arm to selectively move said engaging arm between said contact position and said release position.

8. The cutout of claim 1 wherein said reclosing mechanism includes a movable contact and a stationary contact, the temporary interruption of power being caused by moving said movable contact out of physical engagement from said stationary contact.

9. The cutout of claim 1 further comprising a motor module secured to said second terminal and adapted to move said fuse assembly from said lockout position to said engaged position.

10. The cutout of claim 1 wherein the motor module includes a communication system adapted to transmit fault condition alerts and to receive commands to move said fuse assembly from said cutout position to said engaged position.

11. A cutout for use in an electrical distribution network to electrically connect a first electric cable with a second electrical cable, the cutout comprising:
    an electrically non-conductive insulator having a first end and a second end;
    a first terminal assembly secured to said first insulator end and electrically connected to the first electric cable, said first terminal having a first and second electrically conductive spaced tooth;
    a second terminal assembly secured to said second insulator end and electrically connected to the second electric cable;
    a recloser assembly pivotally secured to said second terminal and movable between an upright engaged position and a hanging, lockout position, said recloser assembly including a reclosing mechanism having an engaging arm that is movable between an extended position and a retracted position,
    when said recloser assembly is in said upright position and said engaging arm is in said extended position, said engaging arm contacts one of said first or said second tooth, and wherein said reclosing mechanism moves said engaging arm to said retracted position when said reclosing mechanism senses a fault condition, thereby disengaging said engaging arm from said tooth.

12. The cutout of claim 11 wherein said reclosing assembly hangs at an angle, so that, when said engaging arm moves to said retracted position, said reclosing assembly pivots under the influence of gravity.

13. The cutout of claim 11 wherein said engaging arm moves from the retracted position to the extended position after said engaging arm moves past one of said teeth, so that said engaging arm contacts the next said tooth.

14. The cutout of claim 12 wherein said teeth are carried by an arc shaped base member.

15. The cutout of claim 11 further comprising a motor module secured to said second terminal and adapted to move said recloser assembly from said cutout position to said engaged position.

16. The cutout of claim 11 wherein the motor module includes a communication system adapted to transmit fault condition alerts and to receive commands to move said recloser assembly from said cutout position to said engaged position.

17. A cutout for use in an electrical distribution network to electrically connect a first electric cable with a second electrical cable, the cutout comprising:
   an electrically non-conductive insulator having a first end and a second end;
   a first terminal assembly secured to said first insulator end;
   a second terminal assembly secured to said second insulator end;
   a fuse assembly pivotally secured to said second terminal and movable between an engaged position and a hanging, lockout position;
   a reclosing mechanism secured to said first terminal that monitors electrical current through said fuse assembly and if a fault condition exists, opens and then closes the electrical link between the first and second electrical cable, if after a predetermined number of closes the fault condition still exists, said reclosing mechanism disconnects from said fuse assembly, allowing said fuse assembly to fall to said lockout position.

18. The cutout of claim 17 wherein the electrical load that triggers said fault condition in said recloser mechanism is lower than the electrical load at which said fuse assembly will blow.

* * * * *